Figure 1:
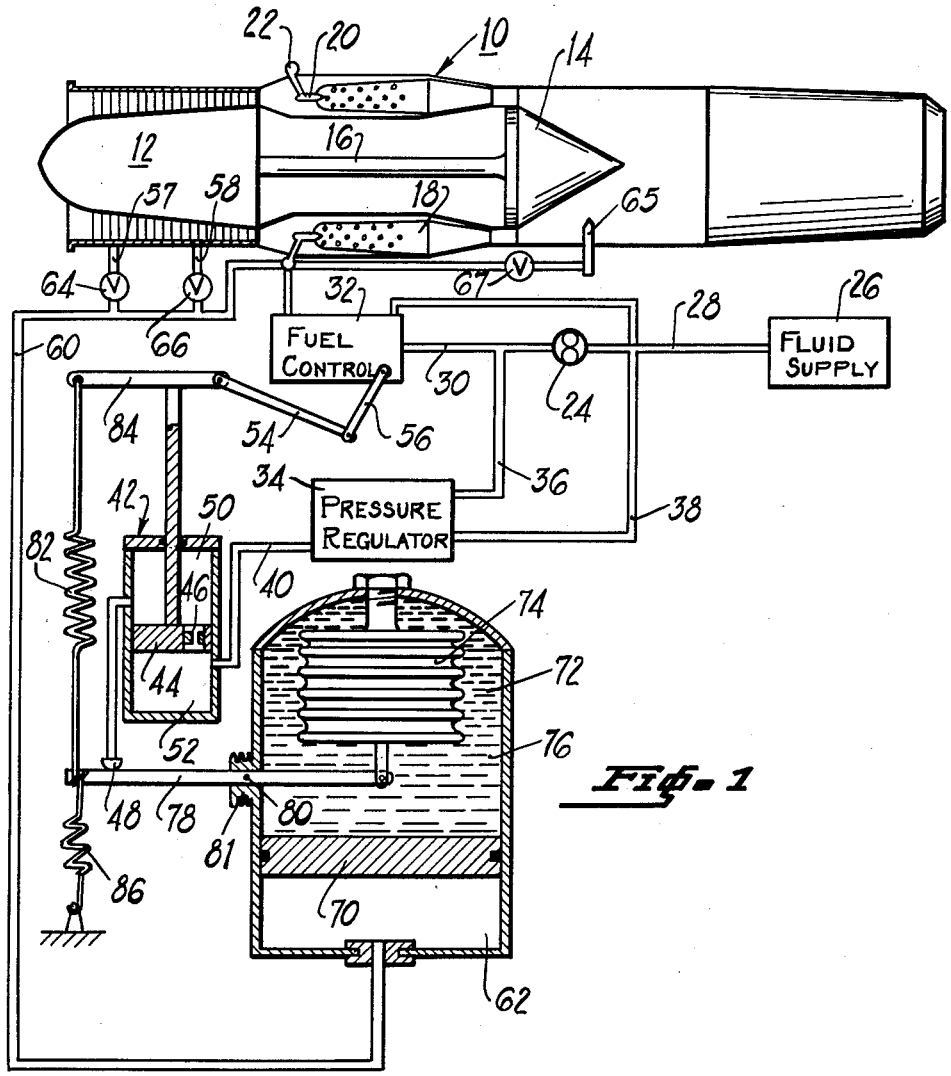

July 31, 1962  R. C. PERKEY ET AL  3,046,740
FLUID PRESSURE RESPONSIVE CONTROL APPARATUS
Filed Dec. 5, 1956  2 Sheets-Sheet 1

INVENTORS
RUSSELL C. PERKEY
RODNEY J. SATORY
BY- *R.J.Brodahl*
ATTORNEY

July 31, 1962  R. C. PERKEY ET AL  3,046,740
FLUID PRESSURE RESPONSIVE CONTROL APPARATUS
Filed Dec. 5, 1956  2 Sheets-Sheet 2

INVENTORS
RUSSELL C. PERKEY
RODNEY J. SATORY
BY- R.J.Brodahl
ATTORNEY

United States Patent Office 3,046,740
Patented July 31, 1962

3,046,740
FLUID PRESSURE RESPONSIVE CONTROL APPARATUS
Russell C. Perkey and Rodney J. Satory, South Bend, Ind., assignors to The Bendix Corporation, a corporation of Delaware
Filed Dec. 5, 1956, Ser. No. 626,393
2 Claims. (Cl. 60—39.28)

The present invention relates in general to control apparatus and more particularly to fluid pressure responsive control apparatus, including an evacuated bellows member or the like.

In applications for controlling an internal combustion engine, it has been a problem with prior art control apparatus, including a control member such as an evacuated bellows member responsive to some fluid pressure which varies as a function of the engine operation, that said apparatus is susceptible to an excessive amplitude of objectionable physical vibrations at or near the natural resonant frequency of that apparatus due to the operation of the engine. This vibration is very objectionable for use in particularly servo control force systems in that the desired servo control member travel may be only in the order of a few one-thousandths of an inch or even a few ten thousandths of an inch and any physical change in the bellows member not directly a function of an input control signal is very objectionable in this respect.

Accordingly it is an object of the present invention to provide an improved control apparatus which is less susceptible to physical vibration and has a much higher natural frequency of vibration than is likely to occur in the course of its usage.

It is another object of the present invention to provide an improved control apparatus including a fluid pressure responsive member such as an evacuated bellows member or the like which is more effectively damped with regard to external physical vibration.

It is a different object of the present invention to provide an improved fluid pressure responsive control apparatus which is more effectively damped, such that the matter of damping introduces a minimum of friction forces and, hence, makes the apparatus more sensitive.

It is an additional object of the present invention to provide an improved fluid pressure responsive control apparatus which is more effectively damped against physical vibration relative to any and all planar directions taken through the apparatus.

It is a further object of the present invention to provide an improved fluid pressure responsive control apparatus which is operative over wider temperature and/or pressure ranges without appreciable loss of sensitivity or damage to said apparatus.

Figure 2:
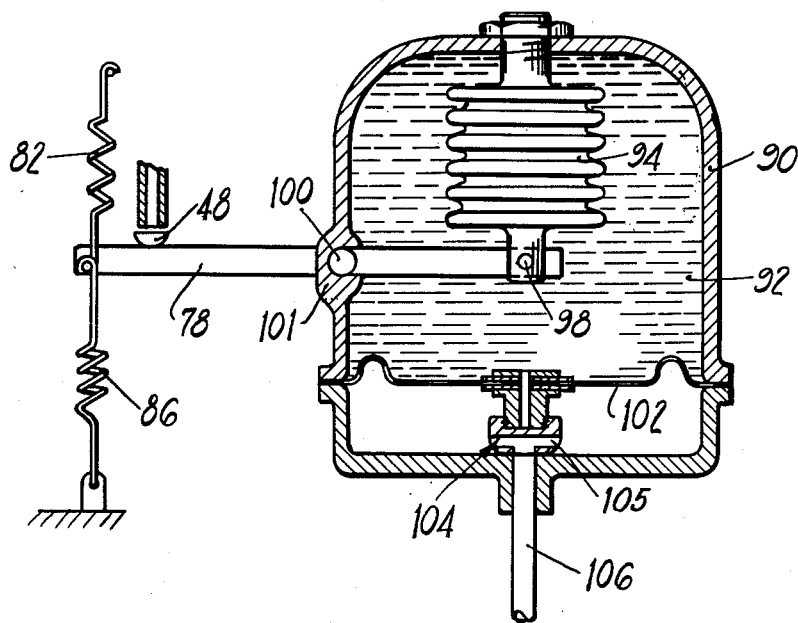

These and other objects and advantages of the present invention will become apparent in view of the following description, taken in conjunction with the drawings, wherein:

FIGURE 1 shows a schematic illustration of a control apparatus in accordance with the present invention; and FIGURE 2 illustrates a modified form of the control apparatus in accordance with the present invention.

In FIGURE 1 there is shown a gas turbine engine 10, including a compressor 12 and a turbine 14 interconnected by a drive shaft 16. A plurality of combustion chambers 18 are each provided with a fuel nozzle 20 connected to a common fuel manifold 22. A fluid pump 24 is operative to supply pressurized fuel from a fluid or fuel supply 26 through a pump inlet conduit 28 and through an output conduit 30 to a fuel control device 32. A servo pressure regulator 34 receives fuel or fluid at pump output pressure through a conduit 36 and a regulating fluid pressure at pump inlet pressure through a second conduit 38. A regulated pressure fluid output conduit 40 containing pressure regulated fluid is connected to a cylinder 42 containing a fluid pressure operative piston member 44. The piston member 44 includes a control bleed 46, such that a flapper valve or half-ball 48 is operative to control the fluid pressure within a first half 50 of the cylinder 42 as compared to the higher pressure fluid within the second half 52 of the cylinder 42. The area of the piston 44 exposed to the higher pressure fluid within the second half 52 is less than the area of the piston 44 exposed to the control fluid within the first half 50 of the cylinder 42. The piston member 44 may be connected through a control link member 54 as shown to a control arm 56 of the fuel control 32. A pressure or temperature responsive device 57 is positioned to respond to the pressure or temperature of the air or operating fluid at the inlet to the engine 10. If it is desired to sense the compressor outlet pressure or temperature instead, a suitable sensing device 58 may be provided.

A control fluid connection 60 is connected between the sensing devices 57 and 58 and a fluid displacement responsive chamber 62. In this respect, control valves 64 and 66 are provided, such that if it is desired to respond to the pressure or temperature at the inlet of the compressor 12, the control valve 66 is closed. On the other hand, if it is desired to respond to the pressure or temperature at the outlet of the compressor 12, the control valve 64 is closed. In this respect it should be understood that temperature or pressure responsive devices such as the elements 57 and 58 may be provided at any of the intermediate stages of the compressor 12 or at any other position along the airflow path through the engine 10, for example, a sensing device 65 is shown at the outlet of the turbine 14 and a control valve 67 is provided to close off the sensing device 65 when it is desired to use one of the devices 57 or 58.

The fluid displacement responsive chamber 62 includes a piston member 70 which is operative within a fluid chamber 72. The latter fluid chamber 72 includes an evacuated bellows member 74 and a high viscosity damping material 76 which is not appreciably compressible and which will not freeze or boil within the operating temperature range of the control apparatus in accordance with the present invention.

One end of the bellows member 74 is rigidly connected to a closed end of the chamber 72 and the other end is connected to a pivoted control arm 78, which is pivotally fastened to the chamber wall 72 at a pivot connection 80 including a fluid seal, for example a bellows member 81. The control arm 78 is operative to control the position of the half-ball member 48 previously described.

A feedback spring member 82 may be connected between an extended arm 84 of the piston member 44 and the control arm 78. A balancing spring member 86 is connected between the control arm 78 and some fixed reference point as shown in FIGURE 1.

Referring to the apparatus as shown in FIGURE 2, there is shown a fluid chamber or container 90 containing a high viscosity damping material or liquid 92. An evacuated bellows member 94 is positioned within the chamber 90 with its movable end connected to a control arm 78 through the pivot connection 98. The control arm 78 is pivotally supported by the chamber 90 at pivot connection 100 including a conventional rotary type of fluid seal having a portion 101 extending in a direction substantially perpendicular to the plane of the drawing and cooperative with a surrounding sleeve member such that an effective fluid seal is provided. The control arm 78 is operative to control a position of a flapper valve or half-ball 48, which may correspond to the half-ball 48 as shown in FIGURE 1. The feedback spring 82 and the balancing spring 86 are substantially the same as shown in FIGURE 1.

A flexible diaphragm member 102 effectively closes the open end of the chamber 90. The controlling input signal may be responsive to any predetermined operating parameter or condition of the engine 10 as may be desired such as the pressure and temperature at some predetermined location along the airflow path through the engine or the like. The input signal is supplied through the conduit or connection 106 from the sensing devices 57 or 58 to apply a control force to the diaphragm member 102, which control force is proportional to the pressure or temperature sensed by and operatively controlling the control device 104.

In the operation of the control apparatus in accordance with the present invention, vibration damping is provided to pressure responsive members 74 and 94 by a high viscosity material 76 as shown in FIGURE 1 and 92 in FIGURE 2 such as a high viscosity liquid or grease which will not freeze or boil in the operating temperature range of the control apparatus. This material is operative to provide viscous damping of such a magnitude as is desirable. The pressure signal is transmitted through the provided high viscosity liquid or material to an evacuated bellows member 74 and 94 as shown in FIGURES 1 and 2 respectively. The chamber or cylinder 90 as shown in FIGURE 2 is sealed to prevent any loss of the high viscosity damping material 92 and to prevent the introduction of any foreign material into the damping material 92. The travel of the diaphragm 102 may be limited if desired to prevent the damping material 92 from allowing excessive movement.

The damping material 76 of FIGURE 1 and the damping material 92 of FIGURE 2 should preferably have a viscosity such that in effect it provides a cushioning force on the bellows members 74 and 94 respectively, in all three planes and surrounding the bellows members. In this respect even a pliable solid material, such as suitable plastics or rubber may be used. Further the bellows members may be molded within a casing of the solid material, either before or after the bellows members are placed within the respective containers 72 and 90.

Although the present invention has been described with a certain degree of particularity, it should be understood that the present disclosure has been made only by way of example and that numerous changes in the details of construction and in the combination and arrangement of parts may be resorted to without departing from the spirit and scope of the present invention.

We claim:

1. In fluid pressure responsive control apparatus subject to physical vibration, the combination of a fluid chamber having an open end, an evacuated bellows member positioned within said chamber, a flexible diaphragm member positioned to close said open end, a high viscosity non-compressible control fluid filling said chamber as closed by said diaphragm member and operative to dampen physical vibrations acting on said bellows member, with said diaphragm member having an outer surface against which a control signal is applied to move said bellows member.

2. In fluid responsive control apparatus subject to physical vibrations, the combination of a fluid chamber having an open end and being filled with a high viscosity non-compressible control fluid, an evacuated bellows member positioned within said chamber and responsive to the pressure of said control fluid, a movable member operative with said chamber and positioned to close said open end, with said movable member having an outer surface against which the control signal is applied to move the member and thereby vary the pressure of said control fluid as a function of said control signal, said high viscosity control fluid operative to dampen the physical vibration acting on said evacuated bellows member.

References Cited in the file of this patent

UNITED STATES PATENTS

| | | |
|---|---|---|
| 1,735,964 | Eule | Nov. 19, 1929 |
| 2,036,582 | Kollsman | Apr. 7, 1936 |
| 2,434,794 | Giesler | Jan. 20, 1948 |
| 2,466,071 | Barnes et al. | Apr. 5, 1949 |
| 2,627,750 | Titus | Feb. 10, 1953 |
| 2,667,743 | Lee | Feb. 2, 1954 |
| 2,705,021 | Wiley | Mar. 29, 1955 |
| 2,715,339 | Honig | Aug. 16, 1955 |
| 2,741,089 | Jagger | Apr. 10, 1956 |
| 2,796,733 | Pearl et al. | June 25, 1957 |

FOREIGN PATENTS

| | | |
|---|---|---|
| 702,868 | France | Jan. 27, 1931 |